(12) United States Patent
Ryu et al.

(10) Patent No.: US 7,621,992 B2
(45) Date of Patent: *Nov. 24, 2009

(54) INK COMPOSITION INCLUDING CHROMOPHORE-MIMIC ADDITIVE AND INKJET PRINTER CARTRIDGE AND INKJET RECORDING APPARATUS INCLUDING THE SAME

(75) Inventors: Seung-min Ryu, Yongin-si (KR); Yeon-kyoung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

This patent is subject to a terminal disclaimer.

(21) Appl. No.: 11/379,661

(22) Filed: Apr. 21, 2006

(65) Prior Publication Data
US 2006/0244801 A1 Nov. 2, 2006

(30) Foreign Application Priority Data
Apr. 27, 2005 (KR) .................... 10-2005-0035052

(51) Int. Cl.
*C09D 11/00* (2006.01)
*C09D 11/02* (2006.01)
*B41J 2/01* (2006.01)

(52) U.S. Cl. .............. 106/31.27; 106/31.47; 106/31.49; 106/31.52; 106/31.58; 106/31.6; 106/31.77; 106/31.78; 106/31.81; 106/31.86; 347/100

(58) Field of Classification Search .............. 106/31.27, 106/31.6, 31.52, 31.81, 31.47, 31.77, 31.49, 106/31.78, 31.58, 31.86; 347/100
See application file for complete search history.

(56) References Cited

U.S. PATENT DOCUMENTS

| | | | | |
|---|---|---|---|---|
| 5,264,032 | A * | 11/1993 | Dietz et al. ................. | 106/411 |
| 5,300,143 | A * | 4/1994 | Schwarz, Jr. ............. | 106/31.43 |
| 5,302,197 | A | 4/1994 | Wickramanayke et al. | |
| 5,891,934 | A | 4/1999 | Moffatt et al. | |
| 5,944,887 | A * | 8/1999 | Schutze et al. ............. | 106/411 |
| 7,045,638 | B2 * | 5/2006 | Weber et al. ................ | 106/493 |
| 7,077,898 | B2 * | 7/2006 | Babler ......................... | 106/476 |
| 7,147,704 | B2 * | 12/2006 | Ueno .......................... | 106/498 |
| 7,198,667 | B2 * | 4/2007 | Klopp et al. ................. | 106/493 |
| 7,381,760 | B2 * | 6/2008 | Aida et al. .................. | 106/31.6 |
| 7,485,179 | B2 * | 2/2009 | Roh et al. ................. | 106/31.47 |
| 2006/0117994 | A1 * | 6/2006 | Ryu et al. ................. | 106/31.58 |
| 2007/0002111 | A1 * | 1/2007 | Roh et al. ................. | 106/31.47 |
| 2007/0040881 | A1 * | 2/2007 | Ham et al. ................. | 106/31.47 |
| 2007/0120920 | A1 * | 5/2007 | Taguchi et al. ........... | 106/31.47 |

FOREIGN PATENT DOCUMENTS

| JP | 2002-60658 | 2/2002 |
|---|---|---|
| JP | 2004-67903 | 3/2004 |

* cited by examiner

*Primary Examiner*—Helene Klemanski
(74) *Attorney, Agent, or Firm*—Stanzione & Kim LLP

(57) ABSTRACT

An ink composition having a high optical density, can implement a clear color image and improve the durability of printed images, such as waterproofness, lightfastness, gasfastness, environmental resistance, etc., having excellent storage stability, and does not cause clogging of nozzles of a cartridge of an inkjet printer even after being stored for a long-term. An inkjet printer cartridge including the ink composition, and an inkjet recording apparatus including the cartridge.

29 Claims, 2 Drawing Sheets

INK COMPOSITION INCLUDING CHROMOPHORE-MIMIC ADDITIVE AND INKJET PRINTER CARTRIDGE AND INKJET RECORDING APPARATUS INCLUDING THE SAME

CROSS-REFERENCE TO RELATED APPLICATIONS

This application claims priority under 35 U.S.C. §119(a) from Korean Patent Application No. 2005-35052, filed on Apr. 27, 2005, in the Korean Intellectual Property Office, the disclosure of which is incorporated herein in its entirety by reference.

BACKGROUND OF THE INVENTION

1. Field of the Invention

The present general inventive concept relates to an ink composition including a chromophore-mimic additive, and an ink jet printer cartridge and an ink jet recording apparatus including the same. More particularly, the present general inventive concept relates to an ink composition that shows excellent coloration due to a chromophore-mimic additive, and improves durability of printed images, such as waterproofness, lightfastness, gasfastness, environmental resistance, etc., and an ink jet printer cartridge and an ink jet recording apparatus including the same.

2. Description of the Related Art

As an example of a black dye used to prepare an ink composition for an ink jet printer, Food Black 2, is as described in U.S. Pat. No. 4,197,135.

A color ink composition that can be used together with the black dye described above consists of an ink set including yellow, magenta, and cyan dyes. Examples of dyes used in the ink set include Acid Yellow 23, Direct Red 227, and Acid Blue 9, which are disclosed in U.S. Pat. No. 5,143,547. Other examples include Direct Yellow 86, Acid Red 52, and Acid Blue 9, which are disclosed in U.S. Pat. No. 5,145,519. In addition, U.S. Pat. No. 5,273,573 discloses an ink set using Acid Yellow 23, Acid Red 52, and Acid Blue 9 together with diethylene glycol.

However, although the colorants described above can implement color images, these colorants have very weak durability against light, gas, and heat, and thus the results of printing using the colorants cannot be stored for a long term.

To solve the problems described above, techniques using a pigment having multi-resonance structure (U.S. Pat. Nos. 6,319,309, 6,648,952, and 6,749,674), a pigment together with a dispersant, or a surface-modified self-dispersible pigment that does not require a dispersant (U.S. Pat. Nos. 6,648,953 and 6,506,245) have been proposed to enhance light fastness and durability.

However, it is difficult to use a sufficient amount of the colorant described above since a portion of hydrophobic groups in the molecular structure of the colorant increases and its affinity to water decreases, thereby resulting in a decrease in solubility in water. Finally, a stability of the colorant in ink cannot be maintained so that the colorant precipitates or leads to laser separation in ink. Further, viscosity of the ink rapidly increases and the ink cannot be smoothly ejected and thus clogs nozzles of the cartridge.

SUMMARY OF THE INVENTION

The present general inventive concept provides an ink composition that has a high optical density, can implement a clear color image, improves the durability of printed images, such as waterproofness, lightfastness, gasfastness, environmental resistance, etc., has a uniform viscosity due to improved ink solubility and stability, and has a long-term storage stability and improved stability of use in a cartridge.

The present general inventive concept also provides an inkjet printer cartridge containing the ink composition and an inkjet recording apparatus including the cartridge.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an ink composition, including a macro-chromophore-containing colorant; a chromophore-mimic additive sharing structural characteristics with the macro-chromophore-containing colorant; and a liquid vehicle.

The macro-chromophore-containing colorant can be at least one selected from the group consisting of a radial colorant that has at least 6 multi-membered resonance structures in its molecular structure and at least 4 fused carbon rings or fused aryl rings; an elongated azo colorant including at least 3 azo groups in its molecular structure; and a colorant having at least one light fastness improving moiety.

The present general inventive concept also provides an inkjet printer cartridge including the ink composition described above.

The present invention further provides an inkjet recording apparatus including an inkjet printer cartridge including the ink composition described above.

The liquid vehicle can include water. An initial viscosity of the ink composition can be about 1 to about 7 cps.

The foregoing and/or other aspects and utilities of the present general inventive concept may be achieved by providing an ink composition, including at least one macro-chromophore-containing colorant, at least one chromophore-mimic additive that interacts with the at least one macro-chromophore-containing colorant, and a liquid vehicle.

The interaction between the at least one macro-chromophore-containing colorant and the at least one macro-chromophore-containing colorant can include a hydrophobic interaction. The at least one chromophore-mimic additive can include at least one hydrophobic group that mimics a structure of a chromophore of at least one macro-chromophore-containing colorant to enhance the interaction between the at least one macro-chromophore-containing colorant and the at least one macro-chromophore-containing colorant. The at least one chromophore-mimic additive can include a plurality of chromophore-mimic additives. The plurality of chromophore-mimic additives can be identical to each other. At least two of the plurality of chromophore-mimic additives can be different from each other. A ratio of the at least one chromophore-mimic additive to the at least one macro-chromophore-containing colorant in the ink composition can be about 1:5 to about 20:1. A ratio of the at least one chromophore-mimic additive to the at least one macro-chromophore-containing colorant in the ink composition can be about 4:5 to about 10:1.

The foregoing and/or other aspects and utilities of the present general inventive concept may be achieved by providing an ink mixture, including a first ink composition including at least one macro-chromophore-containing colorant, at least one chromophore-mimic additive that interacts with the at least one macro-chromophore-containing colorant, and a liquid vehicle, and a second ink composition that is different from the first ink composition.

The foregoing and/or other aspects and utilities of the present general inventive concept may be achieved by providing a method of making an ink composition, comprising mixing at least one macro-chromophore-containing colorant, at least one chromophore-mimic additive, and a liquid vehicle to form a homogenous mixture, and filtering the homogenous mixture. The method can further include mixing at least one of an organic solvent, a wetting agent, a surfactant, a dispersant, and a viscosity controller with the at least one macro-chromophore-containing colorant, the at least one chromophore-mimic additive, and the liquid vehicle before filtering the homogenous mixture.

The foregoing and/or other aspects and utilities of the present general inventive concept may be achieved by providing an image forming method, including incorporating into an image forming apparatus an ink composition comprising at least one macro-chromophore-containing colorant, at least one chromophore-mimic additive, and a liquid vehicle, and ejecting droplets of the ink composition in an image-wise pattern onto a substrate. The image forming apparatus may use a thermal ink jet process in which the ink composition in nozzles of the image forming apparatus is selectively heated in an image-wise pattern, thereby causing droplets of the ink composition to be ejected in the image-wise pattern. The image forming apparatus may use a piezoelectric ink jet process wherein droplets of the ink composition are ejected in the image-wise pattern by a piezoelectric device.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
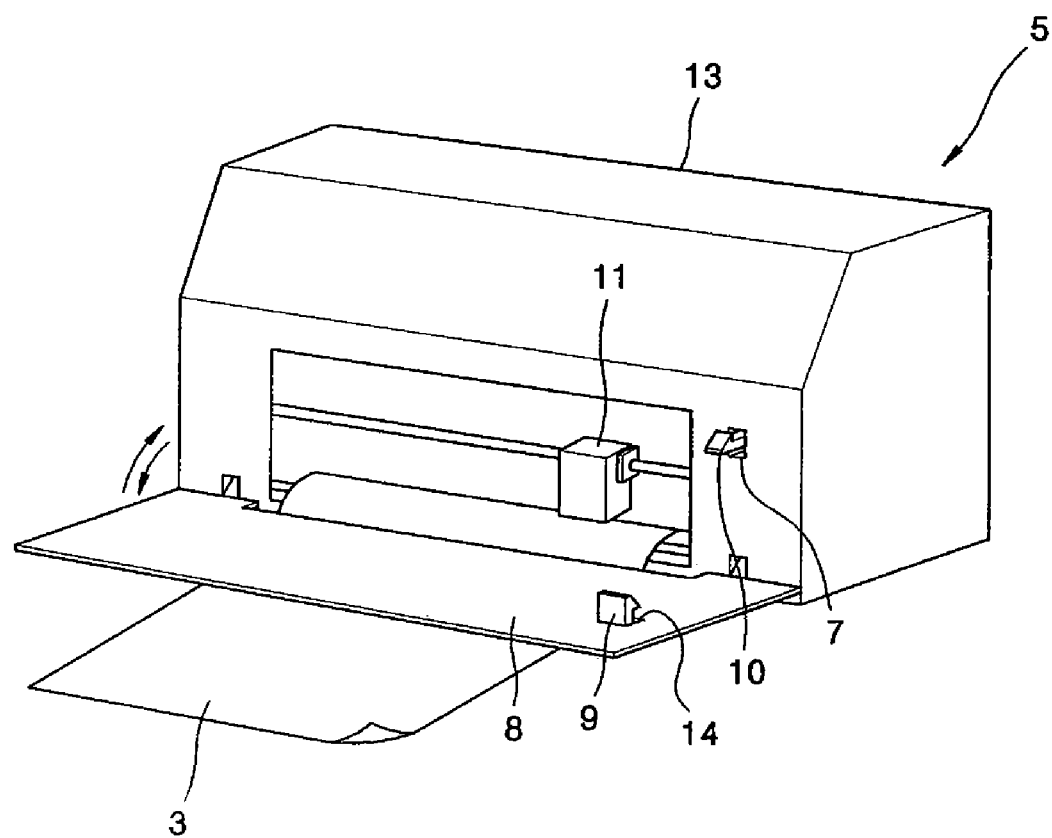
FIG. 1 illustrates an inkjet recording apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The present general inventive concept provides an inkjet ink composition containing at least one color ink, in which the at least one color ink includes a macro-chromophore-containing colorant, a chromophore-mimic additive, and a liquid vehicle (such as water).

Macro-chromophore-containing colorants can be categorized into three types: a radial colorant, an elongated azo colorant, and a colorant having at least one light fastness improving moiety. In addition, the macro-chromophore-containing colorants can fall into more than one of these three category types.

The radial colorant has at least 6 multi-membered resonance structures in its molecular structure, in which at least 4 carbon rings or aryl rings are fused. Representative examples of the radial colorant include an anthrapyridone compound represented by formula (1) below (disclosed in U.S. Pat. No. 6,648,952), a carbon black represented by formula (2) below, and a phthalocyanin blue 15:3 represented by formula (3) below:

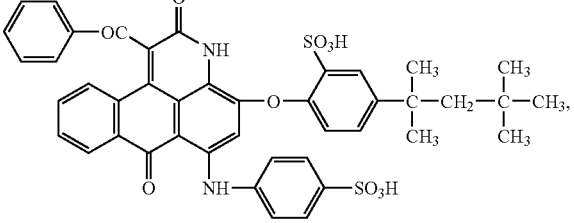

(1)

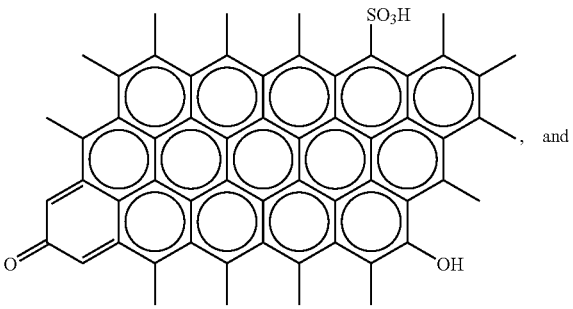

, and (2)

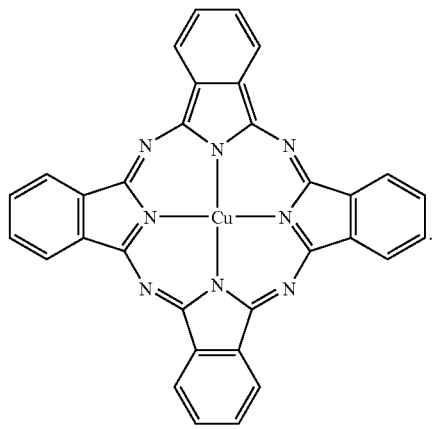

(3)

The elongated azo colorant has at least 3 azo groups in its molecular structure that contribute to color implementation. The phrase "elongated azo colorant" encompasses a colorant including an O, S, or P-containing group having an unshared electron pair instead of a corresponding azo group. A example of the elongated azo colorant includes C.I. Direct Black 62 represented by formula (4) below (disclosed in U.S. Pat. No. 6,749,674)

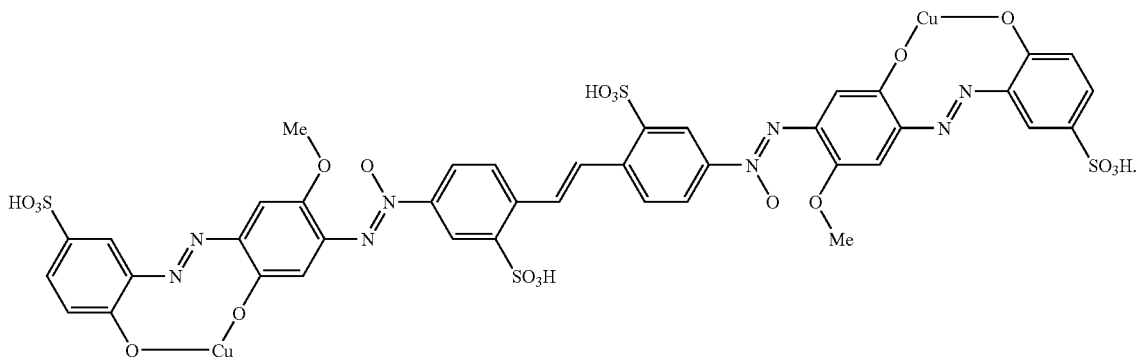
(4)

The colorant having at least one light fastness improving moiety is a colorant that includes a component that can improve light fastness. Specific examples of suitable light fastness improving moieties include triazines, benzimidazoles, tetrazoles, and their derivatives (such as those disclosed in U.S. Pat. No. 6,508,872). An example of the colorant having at least one light fastness improving moiety includes a compound represented by formula (5) below (disclosed in U.S. Pat. No. 6,319,309):

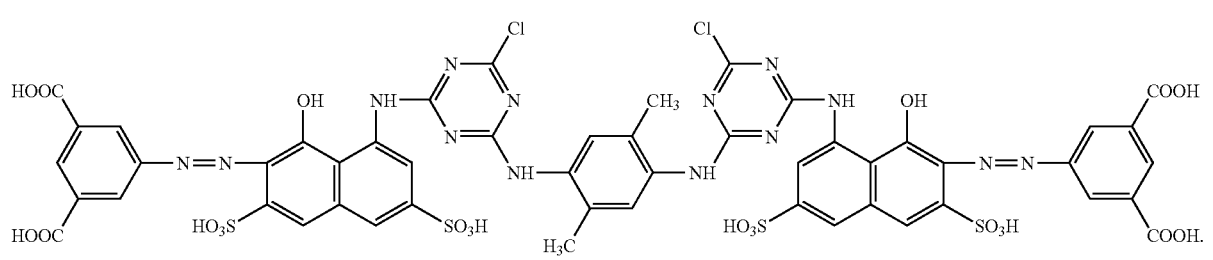
(5)

The chromophore-mimic additive includes a hydrophobic group (A) that mimics the structure of a chromophore to enhance an interaction of the additive with an aromatic ring or a local electron molecular group of the colorant, a group $R_1$ that is hydrogen atom or a hydrophilic group, and a group $R_2$ that is a substituent group, according to formula (12).

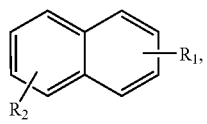
(12)

Non-limiting examples of the chromophore-mimic additive represented by formula (12) above include the following compounds of i) through iii):

i) Aromatic ring compounds in which at least one aromatic ring having C6-C20 are fused or connected through carbons, such as the compounds of formulae (13a) through (13h):

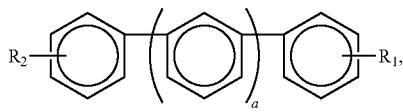
(13a)

-continued

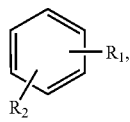
(13b)

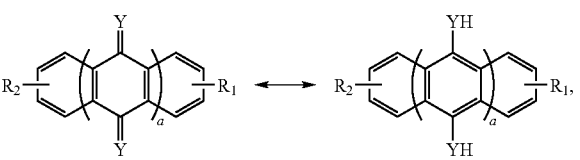
(13c)

(13d)

(13e)

-continued (13f)

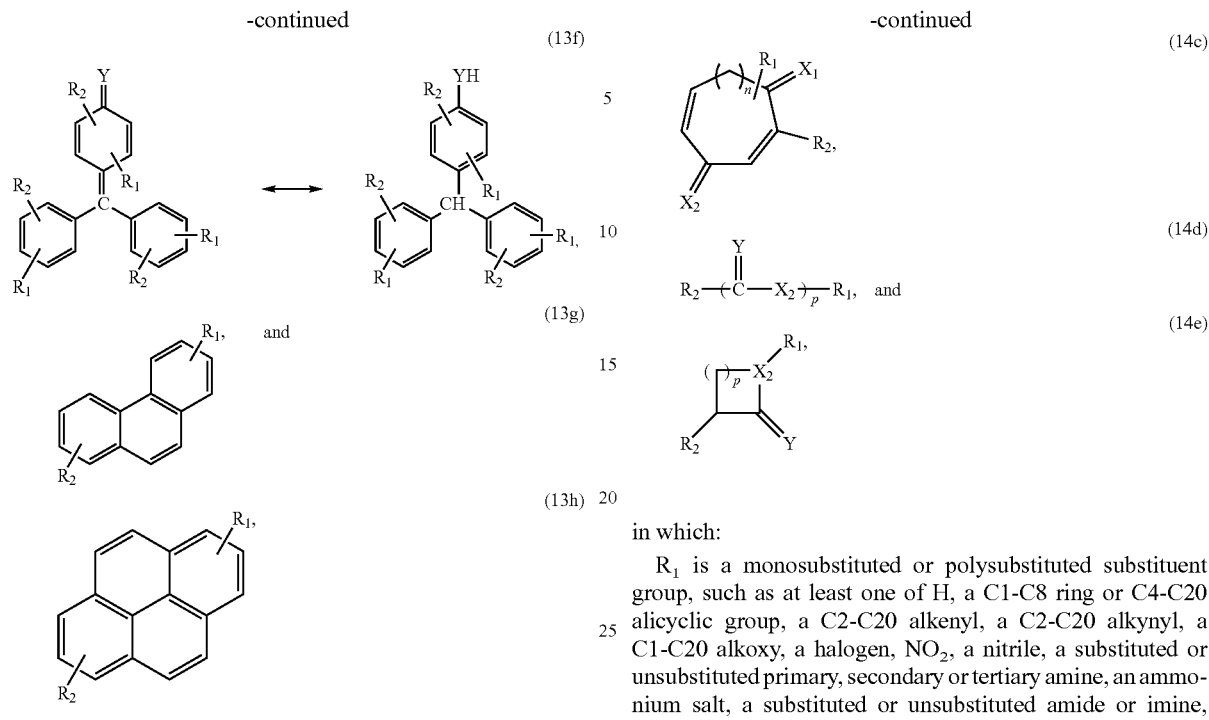

(13g)

(13h)

in which:

R₁ is a monosubstituted or polysubstituted substituent group, such as at least one of H, a C1-C8 ring or C4-C20 alicyclic group, a C2-C20 alkenyl, a C2-C20 alkynyl, a C1-C20 alkoxy, a halogen, $NO_2$, a nitrile, a substituted or unsubstituted primary, secondary or tertiary amine, an ammonium salt, a substituted or unsubstituted amide or imine, carboxylic acid, phosphoric acid, sulfuric acid, and their salts, R₂ is a monosubstituted or polysubstituted substituent group, such as H, a C1-C8 ring or C4-C20 alicyclic group, a C1-C20 alkyl, a C2-C20 alkenyl, a C2-C20 alkynyl, $(EG)_qR_3$, $(EG)_q(PG)_rR_3$, or $(EG)_q(PG)_r(EG)_sR_3$, R₃ is H, COOH, $SO_3H$, a salt thereof, an amino group, or a salt thereof, q, r, and s are integers of 1 to 10, EG represents an ethyleneglycol group, PG represents a propyleneglycol group, and a is an integer of 1 to 10.

ii) C3-C30 alicyclic or ring compounds including at least one electron conjugation or electron delocalization, such as the compounds of formulae (14a) through (14e):

(14a)

$$R_2-(-C \equiv C-\overset{X_1}{\underset{\|}{C}})_l-R_1,$$

(14b)

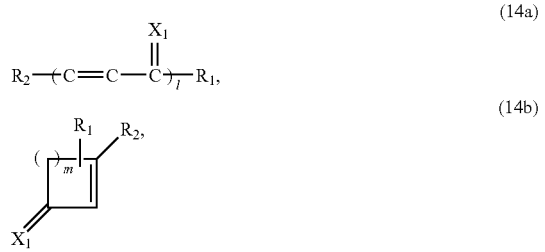

(14c)

(14d)

$$R_2-(-\overset{Y}{\underset{\|}{C}}-X_2)_p-R_1, \text{ and}$$

(14e)

in which:

R₁ is a monosubstituted or polysubstituted substituent group, such as at least one of H, a C1-C8 ring or C4-C20 alicyclic group, a C2-C20 alkenyl, a C2-C20 alkynyl, a C1-C20 alkoxy, a halogen, $NO_2$, a nitrile, a substituted or unsubstituted primary, secondary or tertiary amine, an ammonium salt, a substituted or unsubstituted amide or imine, carboxylic acid, phosphoric acid, sulfuric acid, and their salts, R₂ is a monosubstituted or polysubstituted substituent group, such as H, a C1-C8 ring or C4-C20 alicyclic group, a C1-C20 alkyl, a C2-C20 alkenyl, a C2-C20 alkynyl, $(EG)_qR_3$, $(EG)_q(PG)_rR_3$, or $(EG)_q(PG)_r(EG)_sR_3$, R₃ is H, COOH, $SO_3H$, a salt thereof, an amino group, or a salt thereof, q, r, and s are integers of 1 to 10, EG represents an ethyleneglycol group, PG represents a propyleneglycol group, X₁ is O, N, S, or P, X₂ is O, N, S, or P, Y is O, N, S, or P, l is an integer of 1 to 10, p is an integer of 1 to 9, m is an integer of 1 to 9, and n is an integer of 1 to 6.

iii) C4-C12 single or multi-aromatic ring compounds including at least one heteroatom, such as the compounds of formulae (15a) through (15d):

-continued

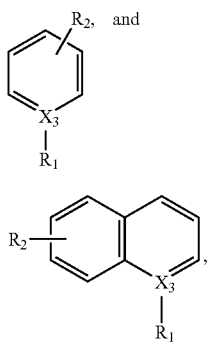

(15c)

(15d)

in which:

R₁ is a monosubstituted or polysubstituted substituent group, such as at least one of H, a C1-C8 ring or C4-C20 alicyclic group, a C2-C20 alkenyl, a C2-C20-alkynyl, a C1-C20 alkoxy, a halogen, $NO_2$, a nitrile, a substituted or unsubstituted primary, secondary or tertiary amine, an ammonium salt, a substituted or unsubstituted amide or imine, carboxylic acid, phosphoric acid, sulfuric acid, and their salts, R₂ is a monosubstituted or polysubstituted substituent group, such as H, a C1-C8 ring or C4-C20 alicyclic group, a C1-C20 alkyl, a C2-C20 alkenyl, a C2-C20 alkynyl, $(EG)_qR_3$, $(EG)_q(PG)_rR_3$, or $(EG)_q(PG)_r(EG)_sR_3$, R₃ is H, COOH, $SO_3H$, a salt thereof, an amino group, or a salt thereof, q, r, and s are integers of 1 to 10, EG represents an ethyleneglycol group, PG represents a propyleneglycol group, and X₃ is O, N, S, or P.

As described above, the chromophore-mimic additives represented by formulae (13a) through (15d) greatly contribute to a solubility and a storage stability of the macro-chromophore-containing colorant. In particular, the chromophore-mimic additive represented by formulae (13a-h) can, for example, enhance a molecular interaction with the radial colorant due to an affinity of the additive to a bulky fused ring of the radial colorant. The chromophore-mimic additive represented by formulae (14a-e) having at least one double bond can, for example, affect the elongated azo colorant due to hydrophobic-hydrophobic interactions between double bonds of the additive. Further, the chromophore-mimic additive represented by formulae (15a-d) including a hetero atom similar to a triazine derivative contained in the molecular structure of the colorant having at least one light fastness improving moiety can, for example, stabilize this colorant. However, when the macro-chromophore-containing colorant and the chromophore-mimic additive are in close molecular proximity due to the hydrophobic-hydrophobic interactions therebetween and due to their structural similarity, any of the chromophore-mimic additives described above can be used provided that they are suitably soluble in water. A combination of at least two of the chromophore-mimic additives also can be used to further improve the characteristics of the macro-chromophore-containing colorant.

An amount of the chromophore-mimic additive (or mixture of chromophore-mimic additives) in the ink composition may be about 20 to about 2,000 parts by weight based on 100 parts by weight of the macro-chromophore-containing colorant. For example, the amount of the chromophore-mimic additive in the ink composition may be about 20 to about 1,000 parts by weight, about 80 to about 2000 parts by weight, about 120 to about 1000 parts by weight, about 120 to about 600 parts by weight, about 180 to about 600 parts by weight, about 350 to about 600 parts by weight, or about 350 to about 500 parts by weight based on 100 parts by weight of the macro-chromophore-containing colorant. When the amount of the chromophore-mimic additive is less than about 20 parts by weight, the solubility of the colorant decreases so that it is difficult to maintain the stability of the colorant in the ink composition, and nozzles may be easily clogged. When the amount of the chromophore-mimic additive exceeds about 2,000 parts by weight, the viscosity of the ink composition increases and adversely affects the stability of discharge of the ink composition.

A ratio of the chromophore-mimic additive (or mixture of chromophore-mimic additives) to the macro-chromophore-containing colorant in the ink composition may be about 1:5 to about 20:1. For example, the ratio of the chromophore-mimic additive to the macro-chromophore-containing colorant in the ink composition may be about 1:5 to about 10:1, about 4:5 to about 20:1, and about 1:1 to about 6:1. Furthermore, the ratio of the chromophore-mimic additive to the macro-chromophore-containing colorant in the ink composition may be about 1:5, about 4:5, about 1:1, about 6:5, about 7:2, about 9:5, about 5:1, about 6:1, about 10:1, or about 20:1.

An amount of liquid vehicle (such as water) in the ink composition may be about 200 to about 9,000 parts by weight based on 100 parts by weight of the macro-chromophore-containing colorant.

The ink composition may further include at least one organic solvent in addition to the chromophore-mimic additive. The organic solvent can be at least one member selected from the group consisting of alcoholic solvents, ketone solvents, ester solvents, polyhydric solvents, N-containing solvents, and S-containing compounds (such as dimethyl sulfoxide, tetramethylsulfone, and thioglycol). An amount of the organic solvent in the ink composition may be about 7 to about 4,000 parts by weight based on 100 parts by weight of the macro-chromophore-containing colorant.

Examples of alcoholic solvents include methyl alcohol, ethyl alcohol, n-propyl alcohol, isopropyl alcohol, n-butyl alcohol, sec-butyl alcohol, t-butyl alcohol, isobutyl alcohol, etc. Examples of ketone solvents include acetone, methylethyl ketone, diethyl ketone, diacetone alcohol, etc. Examples of ester solvents include methyl acetate, ethyl acetate, ethyl lactate, etc. Examples of polyhydric alcohols include ethyleneglycol, diethyleneglycol, triethyleneglycol, propyleneglycol, butyleneglycol, 1,4-butanediol, 1,2,4-butanetriol, 1,5-pentanediol, 1,2,6-hexanetriol, hexyleneglycol, glycerol, glycerol ethoxylate, trimethylolpropane ethoxylate, and the like.

Examples of N-containing solvents include 2-pyrrolidone, N-methyl-2-pyrrolidone, etc. Examples of S-containing solvents include dimethyl sulfoxide, tetramethylenesulfone, thioglycol, and the like.

The ink composition may further include a surfactant to control a surface tension of the ink composition to stabilize jetting of the ink composition through nozzles and to control a degree of permeation of the ink composition into a medium.

The surfactant may be an anionic surfactant, a cationic surfactant, a non-ionic surfactant, or mixtures thereof. Examples of the anionic surfactant include a C1-C1000 alkyl carboxylate (such as C10-C200 alkyl carboxylate), a C1-C1000 alcohol sulfonic ester salt (such as C10-C200 alcohol sulfonic ester salt), a C1-C1000 alkyl sulfonate (such as a C10-C200 alkyl sulfonate), a C1-C1000 alkylbenzene sulfonate (such as a C10-C200 alkylbenzene sulfonate) and mixtures thereof. Examples of the cationic surfactant include a fatty acid amine salt, a quaternary ammonium salt, a sulfonium salt, a phosphonium salt, and mixtures thereof. Examples of the non-ionic surfactant include a polyoxyethylene alkyl ether in which the alkyl group is a C1-C1000 alkyl group (such as a C10-C200 alkyl group), a polyoxyethylene alkyl phenyl ether in which the alkyl group is a C1-C1000 alkyl group (such as a C10-C200 alkyl group), a polyoxyethylene secondary alcohol ether, a polyoxyethylene-oxypropylene block copolymer, a polyglycerine fatty acid ester, a sorbitan fatty acid ester, and mixtures thereof.

An amount of the surfactant in the ink composition may be about 0.07 to about 1,000 parts by weight based on 100 parts by weight of the macro-chromophore-containing colorant.

In addition, the ink composition may further include at least one of a wetting agent, a dispersant, a viscosity controller, a pH adjuster, and an anti-oxidant.

A viscosity of the ink composition should not exceed 3 times an initial viscosity after storage in an air-tightened container at ambient temperature for 3 months or longer. For example, the viscosity after such storage can be 1-2.5 times the initial viscosity. The initial viscosity of the ink composition can be in a range of about 1 to about 7 cps.

Hereinafter, a method of preparing an ink composition according to an embodiment of the present general inventive concept will be described.

A macro-chromophore-containing colorant, a chromophore-mimic additive, such as the compounds represented by formulae (12) through (15), and a liquid vehicle (such as water) can be mixed together. One or more of an organic solvent, a wetting agent, a surfactant, a dispersant, and a viscosity controller can be added to the mixture, which can then be mixed with a stirrer until the mixture become homogeneous.

Then, the resulting homogenous mixture can then be filtered through a filter to obtain an ink composition according to an embodiment of the present general inventive concept. The ink composition can be used alone or in combination with other inks in an inkjet printer capable of printing various color images. The ink composition can be provided in an ink receiving part or an ink cartridge of an inkjet recording apparatus.

An inkjet recording apparatus can include a thermal head using a mechanism that discharges ink droplets using vapor pressure generated by heating the ink composition, a piezo head using a mechanism that discharges ink droplets using a piezo device, a disposable head, or a permanent head. Further, the inkjet recording apparatus can be a scanning printer or an array printer, and can be used for a desktop computer or in the textile or other industries. The above-described head types and printer types and their uses regarding the inkjet recording apparatus are only for illustrative purposes. Thus, the inkjet recording apparatus is not limited to the above examples, and various inkjet recording apparatuses can be used.

FIG. 1 illustrates an inkjet recording apparatus according to an embodiment of the present general inventive concept.

Referring to FIG. 1, the inkjet recording apparatus can include an ink cartridge 11 containing an ink composition including macro-chromophore-containing colorant and a chromophore-mimic additive. A printer cover 8 can be connected to a main body 13 of a printer 5. An engaging portion of a movable latch 10 of the main body 13 can protrude through a hole 7 of the main body 13. The movable latch 10 can engage with a fixed latch 9 of the printer cover 8. The fixed latch 9 can be coupled to the moveable latch 10 when the printer cover 8 is closed. The printer cover 8 can have a recess 14 in a region corresponding to the engaging portion of the movable latch 10 protruding through the hole 7. The ink cartridge 11 can be mounted such that the ink composition can be ejected onto paper 3 passing below the ink cartridge 11.

Figure 2:
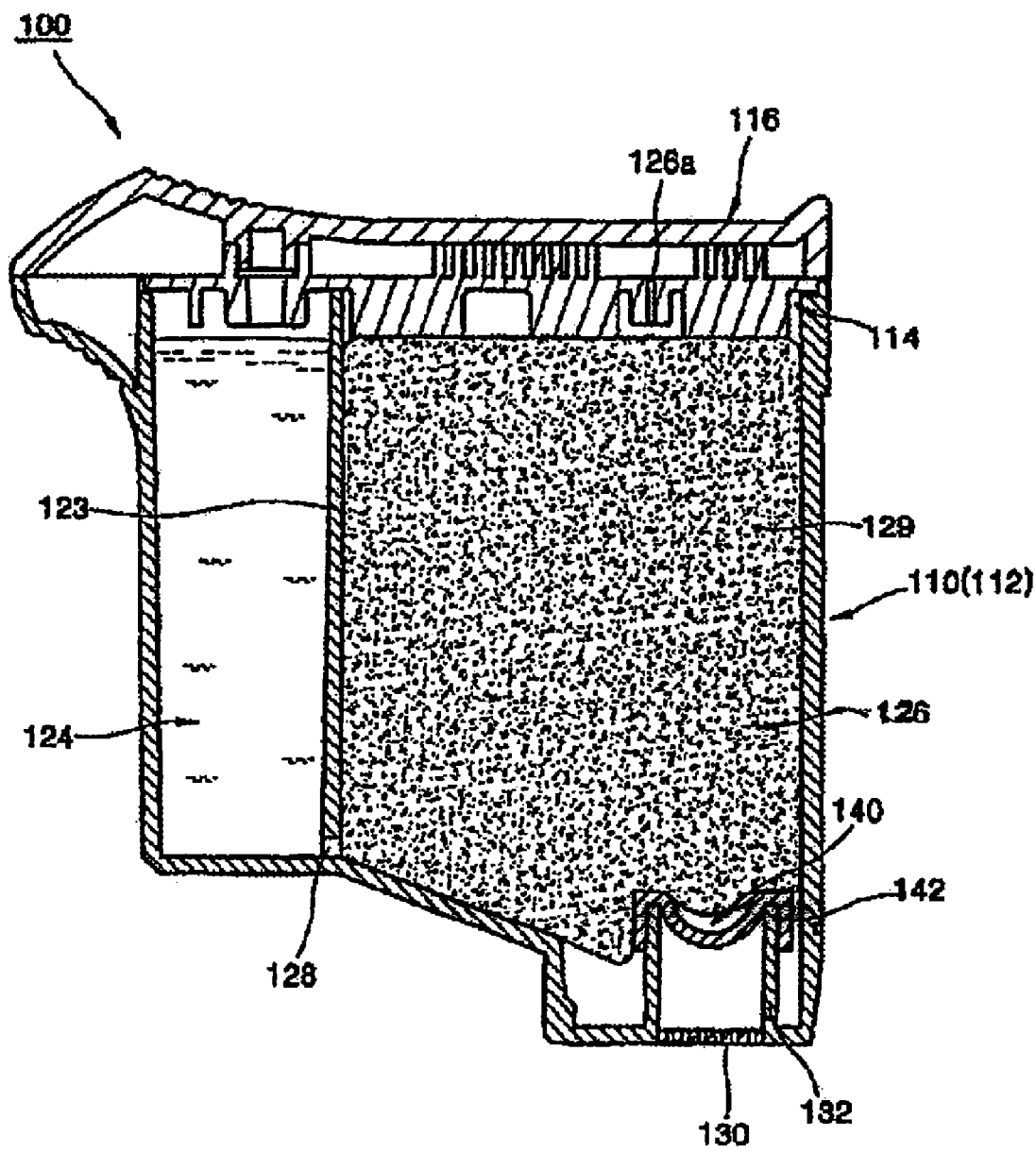
FIG. 2 is a sectional view illustrating an ink cartridge including an ink composition according to an embodiment of the present general inventive concept.

FIG. 2 is a sectional view illustrating an ink cartridge containing an ink composition according to an embodiment of the present general inventive concept. An ink cartridge 100 can include a cartridge main body 110 forming a ink receiver 112, an inner cover 114 to cover a top of the ink receiver 112, and an outer cover 116 that can be spaced a predetermined distance apart from the inner cover 114 and can seal the ink receiver 112 and the inner cover 114.

The ink receiver 112 can be partitioned into a first chamber 124 and a second chamber 126 by a vertical barrier wall 123. An ink passage 128 can be formed in a bottom portion of the vertical barrier wall 123 between the first chamber 124 and the second chamber 126. The ink composition can fill the first chamber 124, a sponge 129, and the second chamber 126. A vent hole 126a can be formed in a region of the inner cover 114 corresponding to the second chamber 126.

A filter 14 can be formed below the second chamber 136 and can filter impurities and micro bubbles in the ink composition to prevent clogging of ejection holes of a printer head 130. A hook 142 can be formed on an edge of the filter 140 and can be coupled to an upper portion of a standpipe 132. The ink composition in the ink receiver 120 can be ejected through the ejection holes of the printer head 130 onto a printing medium in the form of small droplets.

The present general inventive concept will be described in greater detail with reference to the following examples. The following examples are for illustrative purposes and are not intended to limit the scope of the general inventive concept.

EXAMPLES

Examples 1 through 9 and Comparative Examples 1 through 5 were prepared as described in Table 1. In Examples 1 through 9 and Comparative Examples 1 through 5, macro-chromophore-containing colorants and chromophore-mimic additives below were used.

Macro-Chromophore-Containing Colorants

Macro-chromophore-containing colorant 1:

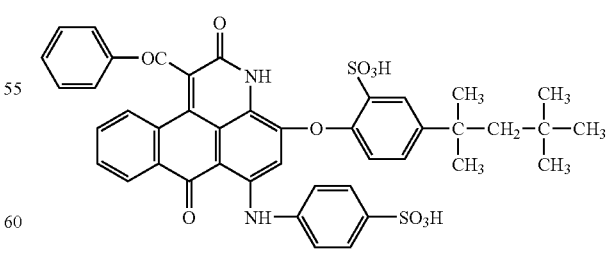

(1)

Macro-chromophore-containing colorant 1 was synthesized with reference to example 1 of U.S. Pat. No. 6,648,952.

Macro-chromophore-containing colorant 2 (Cabot 200 (Cabot)):

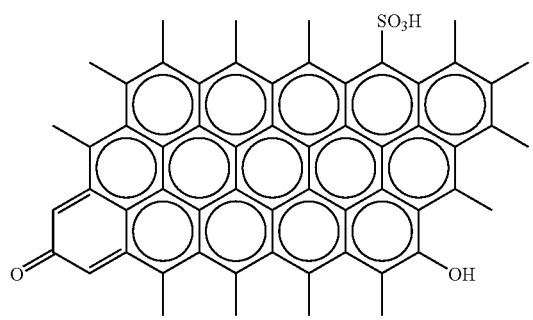
Macro-chromophore-containing colorant 3 (COJ250 (Cabot)):
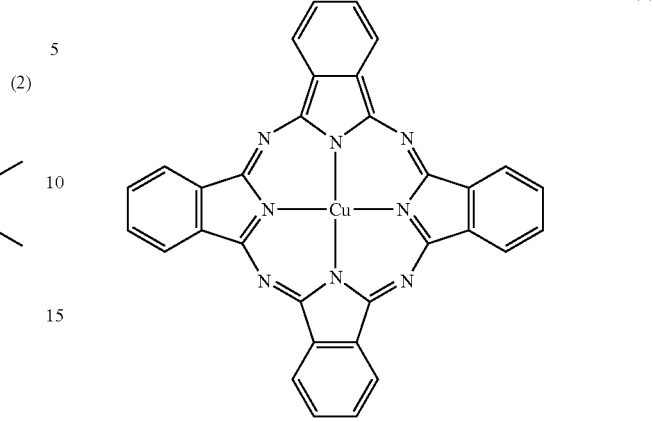
Macro-chromophore-containing colorant 4 (C.I. Direct Black 62 (Standard Dyes Inc.)).
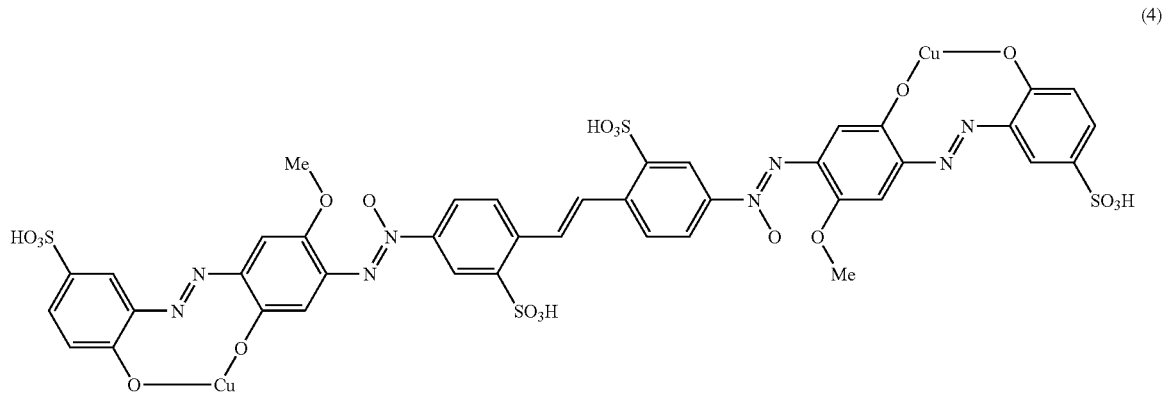
Macro-chromophore-containing colorant 5:
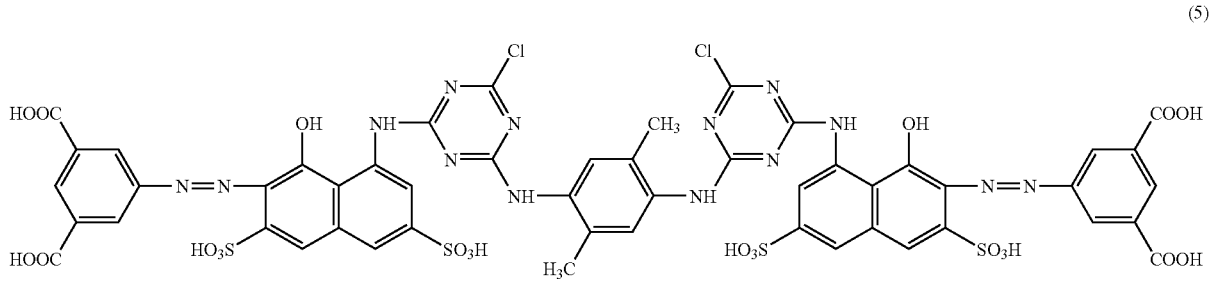

Macro-chromophore-containing colorant 5 was synthesized according to the method in example 1 of EP 0 468 648, except that 2,5-dimethyl-1,4-phenylenediamine was used instead of phenylenediamine.

Chromophore-Mimic Additives

Chromophore-mimic additive 1:

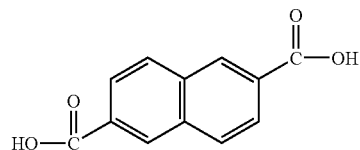
(16)

Chromophore-mimic additive 2:

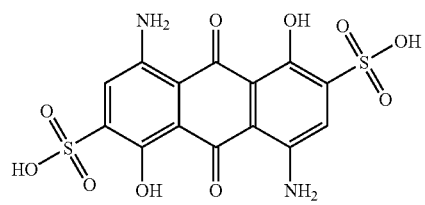
(17)

Chromophore-mimic additive 3:

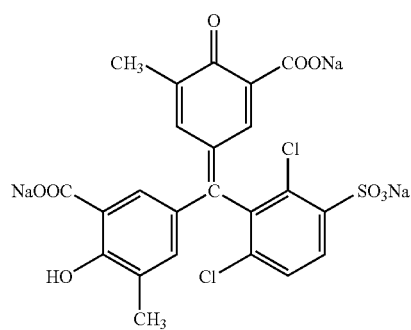
(18)

Chromophore-mimic additive 4:

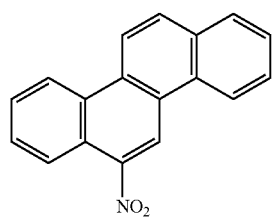
(19)

Chromophore-mimic additive 5:

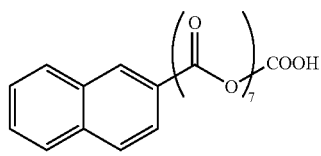
(20)

Chromophore-mimic additive 6:

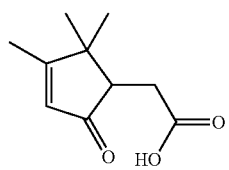
(21)

Chromophore-mimic additive 7:

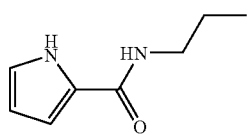
(22)

TABLE 1

| Sample | Macro-chromophore containing colorant (amount*) | Chromophore-mimic additive (amount**) | Other additives (amount**) |
|---|---|---|---|
| Example 1 | Colorant 1(4) | Chromophore-mimic additive 1(20) | Glycerin (250), Surfynol 465(25) |
| Example 2 | Colorant 2(4) | Chromophore-mimic additive 2(100) | Glycerin (200), Surfynol 104(13) |
| Example 3 | Colorant 3(4) | Chromophore-mimic additive 3(80) | EG (500), Urea (100) |
| Example 4 | Colorant 4(5) | Chromophore-mimic additive 4(500) | 1,5-Pentanediol (300), Tergitol (20) |
| Example 5 | Colorant 5(4) | Chromophore-mimic additive 5(120) | EG (400), PEG 600(200) |
| Example 6 | Colorant 1(4) | Chromophore-mimic additive 6(1000) | 2-Pyrrolidone (500), Surfynol 465(25) |
| Example 7 | Colorant 3(3) | Chromophore-mimic additive 1(600) | DEG (400), Surfynol 104(13) |
| Example 8 | Colorant 4(4) | Chromophore-mimic additive 1(200), Chromophore-mimic additive 4(150) | 1,5-Pentanediol (400), Tergitol (25) |
| Example 9 | Colorant 5(4) | Chromophore-mimic additive 2(80), Chromophore-mimic additive 7(100) | DEG (700), Surfynol 465(25) |
| Comparative Example 1 | Colorant 1(4) | — | EG (300), PEG 600(250) |
| Comparative Example 2 | Colorant 4(5) | — | 1,5-Pentanediol (500), Tergitol (15) |
| Comparative Example 3 | Colorant 5(4) | — | 2-Pyrrolidone (600), Surfynol 465(25) |
| Comparative Example 4 | Colorant 4(5) | Chromophore-mimic additive 1(15) | 1,5-Pentanediol (300), 2-Py (120), Surfynol 465(20) |

TABLE 1-continued

(22) [chemical structure: N-propyl-1H-pyrrole-2-carboxamide]

| Sample | Macro-chromophore containing colorant (amount*) | Chromophore-mimic additive (amount**) | Other additives (amount**) |
|---|---|---|---|
| Comparative Example 5 | Colorant 5(2) | Chromophore-mimic additive 5(2100) | EG (1000), Surfynol 465(25) |

*The amount of the colorant is parts by weight based on 100 parts by weight of the ink composition.
**The amounts of chromophore-mimic additive and other additives are parts by weight based on 100 parts by weight of the colorant.

Experiment 1: Long-Term Storage Stability of Ink Compositions (1)

100 mL of each of the ink compositions prepared according to Examples 1-9 and Comparative Examples 1-5 was placed into individual heat resistant vials. The openings of the vials were closed and the closed vials were stored in an incubator at 60° C. After being left for 2 months, it was observed whether there were precipitates on the bottom of the vials or a layer separation occurred. The results are illustrated in Table 2 below. The results were evaluated according to the following criteria:

○: There were no precipitates and no layer separation occurred.
Δ: There were no precipitates but a layer separation occurred.
X: There were precipitates.

Experiment 2: Long-Term Storage Stability of Ink Compositions (2)

100 ml of each of the ink compositions prepared according to Examples 1-9 and Comparative Examples 1-5 was placed into individual heat resistant vials and the openings of the vials were closed. After being left at 25° C. for 3 months, the viscosity of each of the ink compositions was measured. The results are illustrated in Table 2 below. The results were evaluated according to the following criteria:

⊙: viscosity after being left≦initial viscosity×1.2.
○: initial viscosity×1.2<viscosity after being left≦initial viscosity×2.0.
Δ: initial viscosity×2.0<viscosity after being left≦initial viscosity×3.0.
X: viscosity after being left>initial viscosity×3.0.

Experiment 3: Image Quality Test

An ink cartridge C-60 (Samsung Electronics Co., Ltd.) was filled with each of the ink compositions of Examples 1, 4, 5, 6, 8, and 9 and Comparative Examples 1 through 5 containing dye, and an ink cartridge M-50 (Samsung Electronics Co., Ltd.) was filled with each of the ink compositions of Examples 2, 3, and 7 containing pigment. Then, a solid box of 10 cm×10 cm was printed on a Samsung general sheet using each of the ink cartridges in a printer (MJC-2400C, Samsung Electronics Co., Ltd.). The image quality was evaluated according to the degree that white lines occurred in the solid box as follows. The results are illustrated in Table 2 below. The results were evaluated according to the following criteria:

○: few white lines appeared.
Δ: a few white lines appeared.
X: many white lines appeared.

Experiment 4: Test of Light Fastness

An ink cartridge C-60 (Samsung Electronics Co., Ltd.) was filled with each of the ink compositions of Examples 1, 4, 5, 6, 8, and 9 and Comparative Examples 1 through 5 containing dye, and an ink cartridge M-50 (Samsung Electronics Co., Ltd.) was filled with each of the ink compositions of Examples 2, 3, and 7 containing pigment. Then, a solid box of 2 cm×2 cm was printed on a Samsung general sheet using each of the ink cartridges in a printer (MJC-2400C, Samsung Electronics Co., Ltd.) and exposed to light for 100 hours in a Q-SUN Xenon Test Chamber. The optical density (OD) values before and after the test were measured, and an A value corresponding to a light fastness index was calculated using the following equation: $A = OD(\text{after test})/OD(\text{before test}) \times 100(\%)$. The results are illustrated in Table 2 below. The results were evaluated according to the following criteria:

⊙: $A \geq 95$.
○: $A \geq 90$.
Δ: $80 \leq A \leq 90$.
X: $A < 80$.

Experiment 5: Nozzle Clogging Test

An ink cartridge C-60 (Samsung Electronics Co., Ltd.) was filled with each of the ink compositions of Examples 1, 4, 5, 6, 8, and 9 and Comparative Examples 1 through 5 containing dye, and an ink cartridge M-50 (Samsung Electronics Co., Ltd.) was filled with each of the ink compositions of Examples 2, 3, and 7 containing pigment. The ink cartridges were left at ambient temperature (25° C.) and low temperature (−18° C.) each for 2 weeks and used for printing. The number of times that the nozzles were required to be cleaned to enable normal printing were counted. The results are illustrated in Table 2 below. The results were evaluated according to the following criteria:

⊙: normal printing was possible after cleaning nozzles one time.
○: normal printing was possible after cleaning nozzles 2-4 times.
X: normal printing was possible after cleaning nozzles 5-10 times.
XX: normal printing was not possible even after cleaning nozzles 11 times.

TABLE 2

| Sample | Long-term storage stability of ink (1) | Long-term storage stability of ink (2) | Print quality test | Test of light fastness | Nozzle clogging test |
|---|---|---|---|---|---|
| Example 1 | ○ | ⊙ | ○ | ○ | ⊙ |
| Example 2 | ○ | ○ | ○ | ⊙ | ○ |
| Example 3 | ○ | ○ | ○ | ⊙ | ⊙ |

TABLE 2-continued

| Sample | Long-term storage stability of ink (1) | Long-term storage stability of ink (2) | Print quality test | Test of light fastness | Nozzle clogging test |
|---|---|---|---|---|---|
| Example 4 | ○ | ⊙ | ○ | ○ | ○ |
| Example 5 | ○ | ⊙ | ○ | ⊙ | ⊙ |
| Example 6 | ○ | ○ | ○ | ○ | ⊙ |
| Example 7 | ○ | ○ | ○ | ⊙ | ○ |
| Example 8 | ○ | ⊙ | ○ | ○ | ○ |
| Example 9 | ○ | ○ | ○ | ⊙ | ○ |
| Comparative Example 1 | X | Δ | ○ | ○ | XX |
| Comparative Example 2 | X | X | Δ | ○ | XX |
| Comparative Example 3 | X | X | ○ | ⊙ | XX |
| Comparative Example 4 | Δ | Δ | Δ | ○ | XX |
| Comparative Example 5 | ○ | ○ | X | ⊙ | ○ |

As is apparent from Table 2, the ink compositions of Examples 1 through 9 have excellent long-term ink storage stability, image quality, and light fastness, and do not cause clogging of nozzles of the cartridges even after storage for long-term.

Meanwhile, when the chromophore-mimic additive was not added (Comparative Examples 1-3) or the amount of the chromophore-mimic additive was less than 20 parts by weight based on 100 parts by weight of the macro-chromophore-containing colorant (Comparative Example 4), the long-term storage stability was poor and serious nozzle clogging occurred. Meanwhile, when the amount of the chromophore-mimic additive was greater than 2000 parts by weight based on 100 parts by weight of the macro-chromophore-containing colorant (Comparative Example 5), the long-term storage stability of the ink composition was improved and nozzle clogging did not occur. However, the print quality deteriorated due to the high viscosity of the ink composition.

As described above, ink compositions according to various embodiments of the present general inventive concept have a high optical density, can implement a clear color image and improve the durability of printed images, such as waterproofness, lightfastness, gasfastness, environmental resistance, etc., has excellent storage stability, and does not cause clogging of nozzles of a cartridge of an inkjet printer even after being stored for long-term.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An ink composition, comprising:
 a macro-chromophore-containing colorant;
 a chromophore-mimic additive sharing structural characteristics with the macro-chromophore-containing colorant; and
 a liquid vehicle,
 wherein the chromophore-mimic additive is selected from the group consisting of:
 an aromatic ring compound in which at least one aromatic ring having C6-C20 are fused or connected through carbons and which is represented by one of formulae (13a) through (13h):

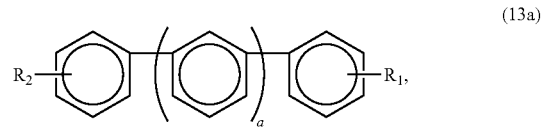

(13a)

(13b)

(13c)

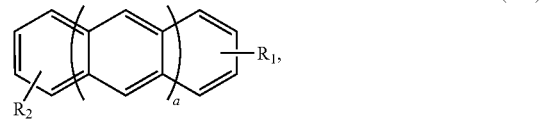

(13d)

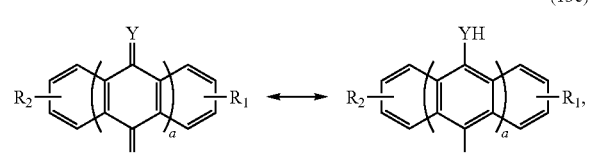

(13e)

(13f)

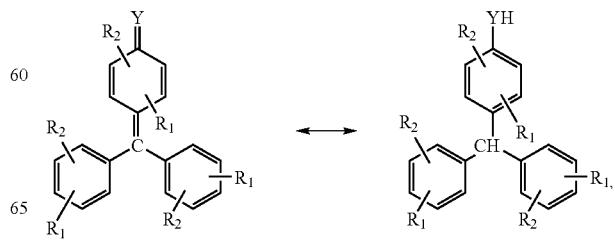

-continued (13g)

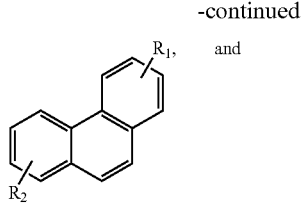

and (13h)

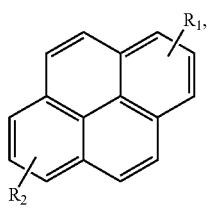

wherein:
$R_1$ is at least one monosubstituted or polysubstituted substituent group selected from the group consisting of H, a C1-C8 ring or C4-C20 alicyclic group, a C2-C20 alkenyl, a C2-C20 alkynyl, a C1-C20 alkoxy, a halogen, $NO_2$, a nitrile, a substituted or unsubstituted primary, secondary or tertiary amine, an ammonium salt, a substituted or unsubstituted amide or imine, carboxylic acid, phosphoric acid, sulfuric acid, and salts thereof, $R_2$ is a monosubstituted or polysubstituted substituent group selected from the group consisting of H, a C1-C8 ring or C4-C20 alicyclic group, a C1-C20 alkyl, a C2-C20 alkenyl, a C2-C20 alkynyl, (ethyleneglycol)$_q$ $R_3$, (ethyleneglycol)$_q$(propyleneglycol)$_r R_3$, and (ethyleneglycol)$_q$(propyleneglycol)$_r$(ethyleneglycol)$_s R_3$, $R_3$ is H, COOH, $SO_3H$, a salt thereof, an amino group, or a salt thereof, q, r, and s are integers of 1 to 10, and Y is O, N, S, or P, and a is an integer of 1 to 10;

a C3-C30 alicyclic or ring compound comprising at least one electron conjugation or electron delocalization and is represented by one of the formulae (14a) through (14e):

(14a)

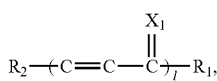

(14b)

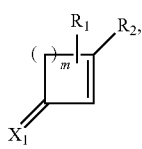

(14c)

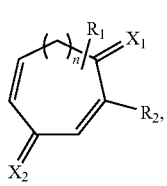

(14d)

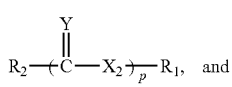

and (14e)

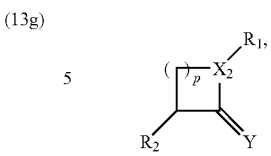

wherein:
$R_1$ is at least one monosubstituted or polysubstituted substituent group selected from the group consisting of H, a C1-C8 ring or C4-C20 alicyclic group, a C2-C20 alkenyl, a C2-C20 alkynyl, a C1-C20 alkoxy, a halogen, $NO_2$, a nitrile, a substituted or unsubstituted primary, secondary or tertiary amine, an ammonium salt, a substituted or unsubstituted amide or imine, carboxylic acid, phosphoric acid, sulfuric acid, and salts thereof, $R_2$ is a monosubstituted or polysubstituted substituent group selected from the group consisting of H, a C1-C8 ring or C4-C20 alicyclic group, a C1-C20 alkyl, a C2-C20 alkenyl, a C2-C20 alkynyl, (ethyleneglycol)$_q$ $R_3$, (ethyleneglycol)$_q$(propyleneglycol)$_r R_3$, and (ethyleneglycol)$_q$(propyleneglycol)$_r$(ethyleneglycol)$_s R_3$, $R_3$ is H, COOH, $SO_3H$, a salt thereof, an amino group, or a salt thereof, q, r, and s are integers of 1 to 10, $X_1$ is O, N, S, or P, $X_2$ is O, N, S, or P, Y is O, N, S, or P, I is an integer of 1 to 10, p is an integer of 1 to 9, m is an integer of 1 to 9, and n is an integer of 1 to 6; and a C4-C12 single or multi-aromatic ring compound comprising at least one heteroatom and is represented by one of formulae (15a) through (15d):

(15a)

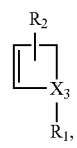

(15b)

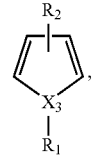

(15c)

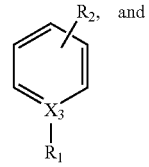

and (15d)

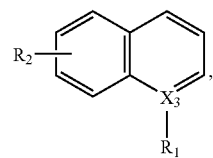

wherein:

R₁ is at least one monosubstituted or polysubstituted substituent group selected from the group consisting of H, a C1-C8 ring or C4-C20 alicyclic group, a C2-C20 alkenyl, a C2-C20 alkynyl, a C1-C20 alkoxy, a halogen, NO₂, a nitrile, a substituted or unsubstituted primary, secondary or tertiary amine, an ammonium salt, a substituted or unsubstituted amide or imine carboxylic acid, phosphoric acid, sulfuric acid, and salts thereof, R₂ is a monosubstituted or polysubstituted substituent group selected from the group consisting of H, a C1-C8 ring or C4-C20 alicyclic group, a C1-C20 alkyl, a C2-C20 alkenyl, a C2-C20 alkynyl, (ethyleneglycol)$_q$R₃, (ethyleneglycol)$_q$(propyleneglycol)$_r$R₃, and (ethyleneglycol)$_q$(propyleneglycol)$_r$(ethyleneglycol)$_s$R₃, R₃ is H, COOH, SO₃H, a salt thereof, an amino group, or a salt thereof, q, r, and s are integers of 1 to 10, and X₃ is O, N, S, or P.

2. The ink composition according to claim 1, wherein the macro-chromophore-containing colorant is at least one selected from the group consisting of a radial colorant that has at least 6 multi-membered resonance structures in its molecular structure and at least 4 fused carbon rings or fused aryl rings; an elongated azo colorant including at least 3 azo groups in its molecular structure; and a colorant having at least one light fastness improving moiety.

3. The ink composition according to claim 2, wherein the radial colorant is selected from the group consisting of an anthrapyridone compound represented by formula (1), a carbon black represented by formula (2), and a phthalocyanin blue 15:3 represented by formula (3):

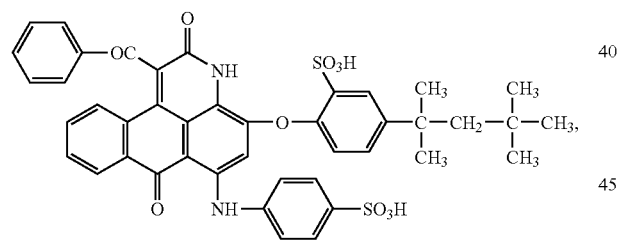
(1)

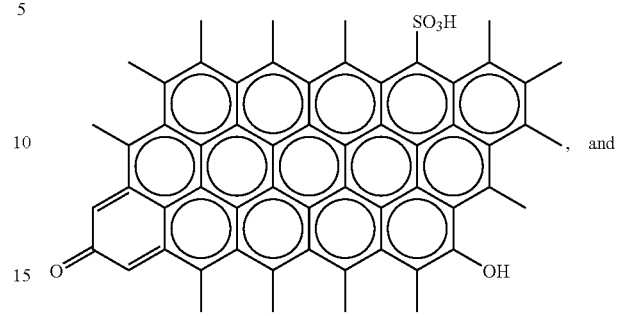
(2), and

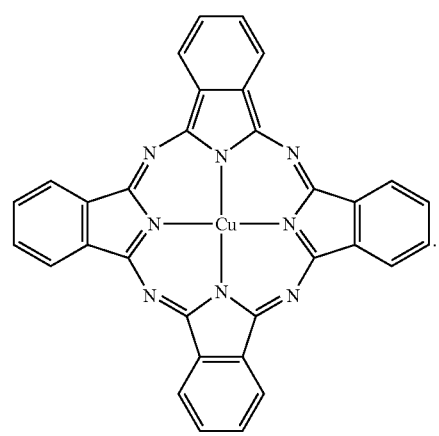
(3)

4. The ink composition according to claim 2, wherein the elongated azo colorant is a compound represented by formula (4):

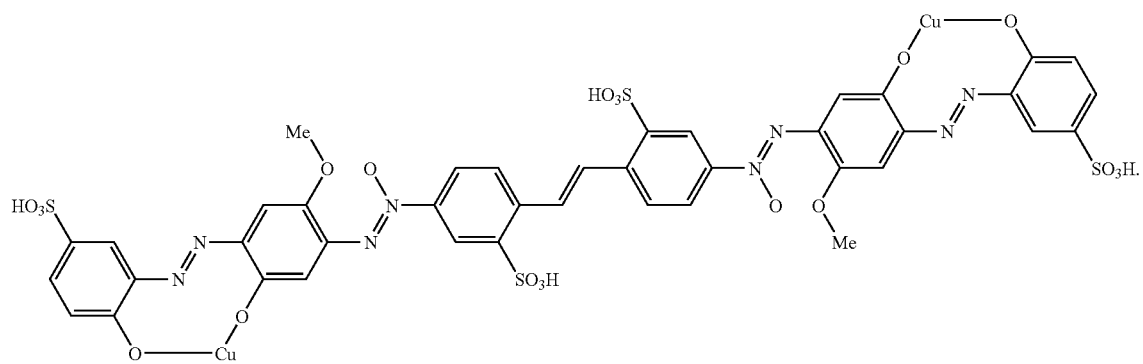
(4)

5. The ink composition according to claim 2, wherein the colorant having at least one light fastness improving moiety is a compound represented by formula (5):

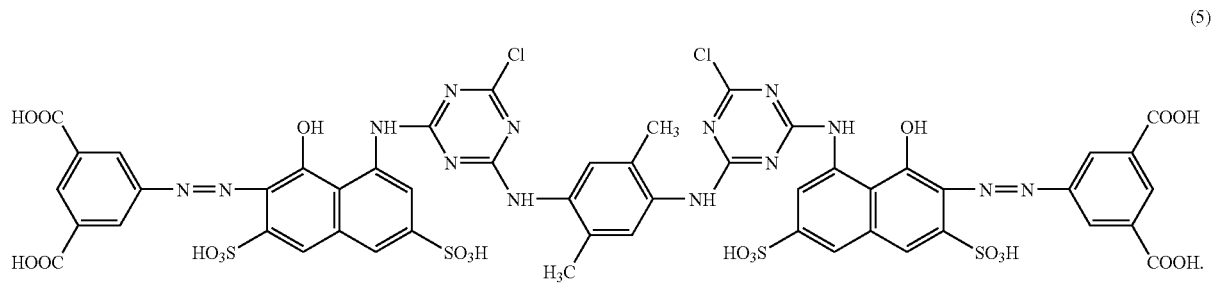

(5)

6. The ink composition according to claim 1, wherein an amount of the chromophore-mimic additive in the ink composition is in a range of about 20 to about 2,000 parts by weight based on 100 parts by weight of the colorant.

7. The ink composition according to claim 1, wherein an amount of the liquid vehicle in the ink composition is in a range of about 200 to about 9,000 parts by weight based on 100 parts by weight of the colorant.

8. The ink composition according to claim 1, further comprising at least one organic solvent selected from the group consisting of alcoholic solvents, ketone solvents, ester solvents, polyhydric solvents, N-containing solvents, and S-containing solvents.

9. The ink composition according to claim 8, wherein an amount of the organic solvent in the ink composition is in a range of about 7 to about 4,000 parts by weight based on 100 parts by weight of the colorant.

10. The ink composition according to claim 1, further comprising a surfactant, wherein an amount of the surfactant in the ink composition is in a range of about 0.07 to about 1,000 parts by weight based on 100 parts by weight of the colorant.

11. An inkjet printer cartridge comprising the ink composition according to claim 1.

12. An inkjet recording apparatus comprising an inkjet printer cartridge including the ink composition according to claim 1.

13. The inkjet recording apparatus according to claim 12, wherein the inkjet recording apparatus is an array printer.

14. The ink composition according to claim 1, wherein the liquid vehicle comprises water.

15. The ink composition according to claim 1, wherein an initial viscosity of the ink composition is about 1 to about 7 cps.

16. An ink composition, comprising:
at least one macro-chromophore-containing colorant;
at least one chromophore-mimic additive that interacts with the at least one a macro-chromophore-containing colorant; and
a liquid vehicle,
wherein the chromophore-mimic additive is selected from the group consisting of:
an aromatic ring compound in which at least one aromatic ring having C6-C20 are fused or connected through carbons and which is represented by one of formulae (13a) through (13h):

(13a)

(13b)

(13c)

(13d)

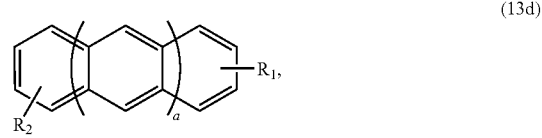
(13e)

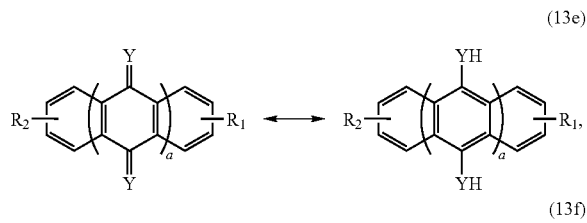
(13f)

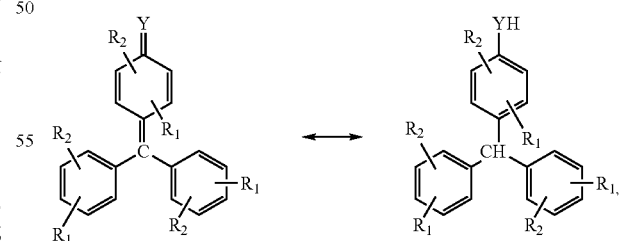

(13g)

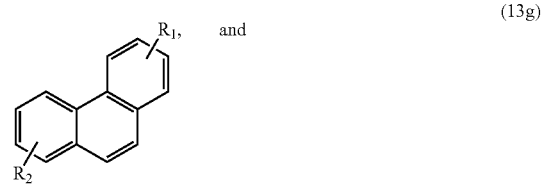
and

-continued (13h)

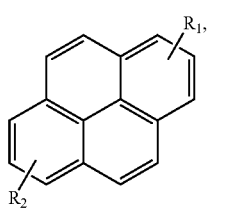

wherein:
R₁ is at least one monosubstituted or polysubstituted substituent group selected from the group consisting of H, a C1-C8 ring or C4-C20 alicyclic group, a C2-C20 alkenyl, a C2-C20 alkynyl, a C1-C20 alkoxy, a halogen, NO₂, a nitrile, a substituted or unsubstituted primary, secondary or tertiary amine, an ammonium salt, a substituted or unsubstituted amide or imine carboxylic acid, phosphoric acid, sulfuric acid, and salts thereof,
R₂ is a monosubstituted or polysubstituted substituent group selected from the group consisting of H, a C1-C8 ring or C4-C20 alicyclic group, a C1-C20 alkyl, a C2-C20 alkenyl, a C2-C20 alkynyl, (ethyleneglycol)$_q$R₃, (ethyleneglycol)$_q$(propyleneglycol)$_r$R₃, and (ethyleneglycol)$_q$(propyleneglycol)$_r$(ethyleneglycol)$_s$R₃,
R₃ is H, COOH, SO₃H, a salt thereof, an amino group, or a salt thereof,
q, r, and s are integers of 1 to 10, and
Y is O, N, S, or P, and
a is an integer of 1 to 10;
a C3-C30 alicyclic or ring compound comprising at least one electron conjugation or electron delocalization and is represented by one of the formulae (14a) through (14e):

(14a)
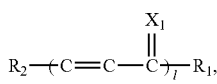

(14b)
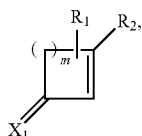

(14c)
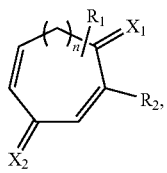

(14d)
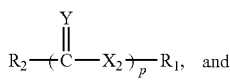

(14e)
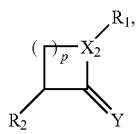

wherein:
R₁ is at least one monosubstituted or polysubstituted substituent group selected from the group consisting of H, a C1-C8 ring or C4-C20 alicyclic group, a C2-C20 alkenyl, a C2-C20 alkynyl, a C1-C20 alkoxy, a halogen, NO₂, a nitrile, a substituted or unsubstituted primary, secondary or tertiary amine, an ammonium salt, a substituted or unsubstituted amide or imine, carboxylic acid, phosphoric acid, sulfuric acid, and salts thereof,
R₂ is a monosubstituted or polysubstituted substituent group selected from the group consisting of H, a C1-C8 ring or C4-C20 alicyclic group, a C1-C20 alkyl, a C2-C20 alkenyl, a C2-C20 alkynyl, (ethyleneglycol)$_q$R₃, (ethyleneglycol)$_q$(propyleneglycol)$_r$R₃, and (ethyleneglycol)$_q$(propyleneglycol)$_r$(ethyleneglycol)$_s$R₃,
R₃ is H, COOH, SO₃H, a salt thereof, an amino group, or a salt thereof,
q, r, and s are integers of 1 to 10,
X₁ is O, N, S, or P,
X₂ is O, N, S, or P,
Y is O, N, S, or P,
l is an integer of 1 to 10,
p is an integer of 1 to 9,
m is an integer of 1 to 9, and
n is an integer of 1 to 6; and
a C4-C12 single or multi-aromatic ring compound comprising at least one heteroatom and is represented by one of formulae (15a) through (15d):

(15a)
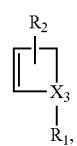

(15b)
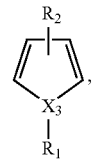

(15c)
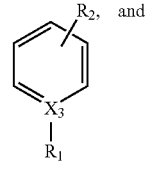

(15d)
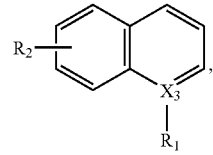

wherein:
R₁ is at least one monosubstituted or polysubstituted substituent group selected from the group consisting of H, a C1-C8 ring or C4-C20 alicyclic group, a C2-C20 alkenyl, a C2-C20 alkynyl, a C1-C20 alkoxy, a halogen, NO₂, a nitrile, a substituted or unsubstituted primary, secondary or tertiary amine, an ammonium salt, a substituted or unsubstituted amide or imine, carboxylic acid, phosphoric acid, sulfuric acid, and salts thereof, R₂ is a monosubstituted or polysubstituted substituent group selected from the group consisting of H, a C1-C8 ring or C4-C20 alicyclic group, a C1-C20 alkyl, a C2-C20 alkenyl, a C2-C20 alkynyl, (ethyleneglycol)$_q$R₃, (ethyleneglycol)$_q$(propyleneglycol)$_r$R₃, and (ethyleneglycol)$_q$(propyleneglycol)$_r$(ethyleneglycol)$_s$R₃, R₃ is H, COOH, SO₃H, a salt thereof, an amino group, or a salt thereof, q, r, and s are integers of 1 to 10, and X₃ is O, N, S, or R.

17. The ink composition according to claim 16, wherein the interaction between the at least one macro-chromophore-containing colorant and the at least one macro-chromophore-containing colorant comprises a hydrophobic interaction.

18. The ink composition according to claim 16, wherein the at least one chromophore-mimic additive comprises at least one hydrophobic group that mimics a structure of a chromophore of the at least one macro-chromophore-containing colorant to enhance the interaction between the at least one macro-chromophore-containing colorant and the at least one macro-chromophore-containing colorant.

19. The ink composition according to claim 16, wherein the at least one chromophore-mimic additive comprises a plurality of chromophore-mimic additives.

20. The ink composition according to claim 19, wherein the plurality of chromophore-mimic additives are identical to each other.

21. The ink composition according to claim 19, wherein at least two of the plurality of chromophore-mimic additives are different from each other.

22. The ink composition according to claim 16, wherein a ratio of the at least one chromophore-mimic additive to the at least one macro-chromophore-containing colorant in the ink composition is about 1:5 to about 20:1.

23. The ink composition according to claim 16, wherein a ratio of the at least one chromophore-mimic additive to the at least one macro-chromophore-containing colorant in the ink composition is about 4:5 to about 10:1.

24. An ink set, comprising:
a first ink composition, comprising:
at least one macro-chromophore-containing colorant,
at least one chromophore-mimic additive that interacts with the at least one macro-chromophore-containing colorant, and
a liquid vehicle; and
a second ink composition that is different from the first ink composition.

25. A method of making an ink composition, comprising:
mixing at least one macro-chromophore-containing colorant, at least one chromophore-mimic additive, and a liquid vehicle to form a homogenous mixture; and
filtering the homogenous mixture.

26. The method according to claim 25, further comprising:
mixing at least one of an organic solvent, a wetting agent, a surfactant, a dispersant, and a viscosity controller with the at least one macro-chromophore-containing colorant, the at least one chromophore-mimic additive, and the liquid vehicle before filtering the homogenous mixture.

27. An image forming method, comprising:
incorporating into an image forming apparatus an ink composition comprising at least one macro-chromophore-containing colorant, at least one chromophore-mimic additive, and a liquid vehicle; and
ejecting droplets of the ink composition in an image-wise pattern onto a substrate, wherein the chromophore-mimic additive is selected from the group consisting of:

an aromatic ring compound in which at least one aromatic ring having C6-C20 are fused or connected through carbons and which is represented by one of formulae (13a) through (13h):

(13a)

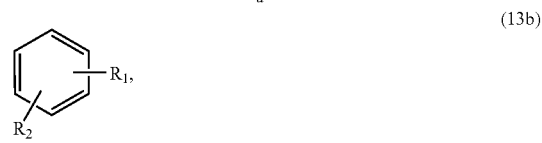
(13b)

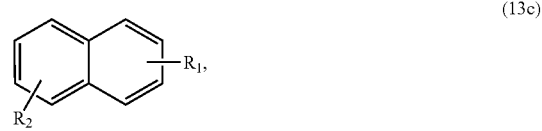
(13c)

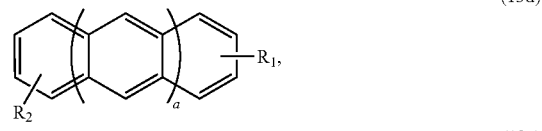
(13d)

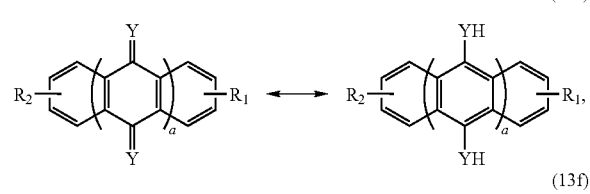
(13e)

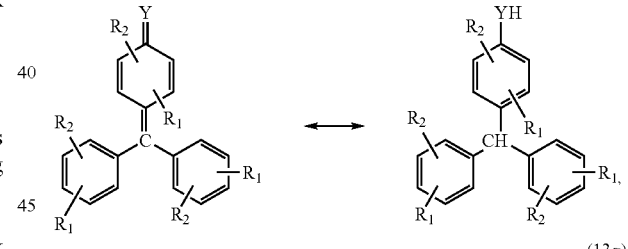
(13f)

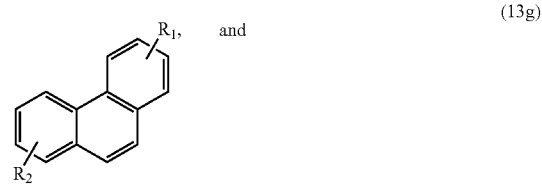
(13g)

and (13h)

wherein:

R₁ is at least one monosubstituted or polysubstituted substituent group selected from the group consisting of H, a C1-C8 ring or C4-C20 alicyclic group, a C2-C20 alkenyl, a C2-C20 alkynyl, a C1-C20 alkoxy, a halogen, NO₂, a nitrile, a substituted or unsubstituted primary, secondary or tertiary amine, an ammonium salt, a substituted or unsubstituted amide or imine carboxylic acid, phosphoric acid, sulfuric acid, and salts thereof, R₂ is a monosubstituted or polysubstituted substituent group selected from the group consisting of H, a C1-C8 ring or C4-C20 alicyclic group, a C1-C20 alkyl, a C2-C20 alkenyl, a C2-C20 alkynyl, (ethyleneglycol)$_q$R₃, (ethyleneglycol)$_q$(propyleneglycol)$_r$R₃, and (ethyleneglycol)$_q$(propyleneglycol)$_r$(ethyleneglycol)$_s$R₃, R₃ is H, COOH, SO₃H, a salt thereof, an amino group, or a salt thereof, q, r, and s are integers of 1 to 10, and Y is O, N, S, or P, and a is an integer of 1 to 10;

a C3-C30 alicyclic or ring compound comprising at least one electron conjugation or electron delocalization and is represented by one of the formulae (14a) through (14e):

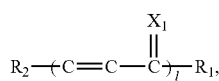
(14a)

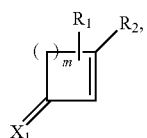
(14b)

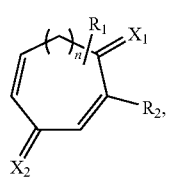
(14c)

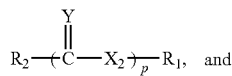
(14d)

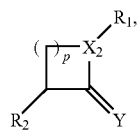
(14e)

wherein:

R₁ is at least one monosubstituted or polysubstituted substituent group selected from the group consisting of H, a C1-C8 ring or C4-C20 alicyclic group, a C2-C20 alkenyl, a C2-C20 alkynyl, a C1-C20 alkoxy, a halogen, NO₂, a nitrile, a substituted or unsubstituted primary, secondary or tertiary amine, an ammonium salt, a substituted or unsubstituted amide or imine carboxylic acid, phosphoric acid, sulfuric acid, and salts thereof, R₂ is a monosubstituted or polysubstituted substituent group selected from the group consisting of H, a C1-C8 ring or C4-C20 alicyclic group, a C1-C20 alkyl, a C2-C20 alkenyl, a C2-C20 alkynyl, (ethyleneglycol)$_q$R₃, (ethyleneglycol)$_q$(propyleneglycol)$_r$R₃, and (ethyleneglycol)$_q$(propyleneglycol)$_r$(ethyleneglycol)$_s$R₃, R₃ is H, COOH, SO₃H, a salt thereof, an amino group, or a salt thereof, q, r, and s are integers of 1 to 10, X₁ is O, N, S, or P, X₂ is O, N, S, or P, Y is O, N, S, or P, I is an integer of 1 to 10, p is an integer of 1 to 9, m is an integer of 1 to 9, and n is an integer of 1 to 6; and a C4-C12 single or multi-aromatic ring compound comprising at least one heteroatom and is represented by one of formulae (15a) through (15d):

(15a)

(15b)

(15c)

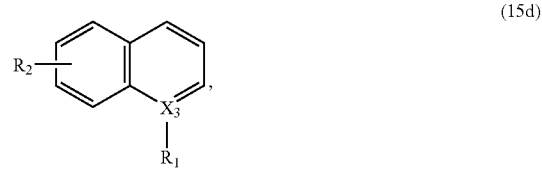
(15d)

wherein:

R₁ is at least one monosubstituted or polysubstituted substituent group selected from the group consisting of H, a C1-C8 ring or C4-C20 alicyclic group, a C2-C20 alkenyl, a C2-C20alkynyl, a C1-C20 alkoxy, a halogen, NO₂, a nitrile, a substituted or unsubstituted primary, secondary or tertiary amine, an ammonium salt, a substituted or unsubstituted amide or imine, carboxylic acid, phosphoric acid, sulfuric acid, and salts thereof, R₂ is a monosubstituted or polysubstituted substituent group selected from the group consisting of H, a C1-C8 ring or C4-C20 alicyclic group, a C1-C20 alkyl, a C2-C20 alkenyl, a C2-C20 alkynyl, (ethyleneglycol)$_q$R₃, (ethyleneglycol)$_q$(propyleneglycol)$_r$R₃, and (ethyleneglycol)$_q$(propyleneglycol)$_r$(ethyleneglycol)$_s$R₃, R₃ is H, COOH, SO₃H, a salt thereof, an amino group, or a salt thereof, q, r, and s are integers of 1 to 10, and X₃ is O, N, S, or P.

28. The image forming method according to claim 27, wherein the image forming apparatus utilizes a thermal ink jet process in which the ink composition in nozzles of the image forming apparatus is selectively heated in an image-wise pattern, thereby causing droplets of the ink composition to be ejected in the image-wise pattern.

29. The image forming method according to claim 27, wherein the image forming apparatus utilizes a piezoelectric ink jet process wherein droplets of the ink composition are ejected in the image-wise pattern by a piezoelectric device.

* * * * *

UNITED STATES PATENT AND TRADEMARK OFFICE
CERTIFICATE OF CORRECTION

PATENT NO. : 7,621,992 B2  Page 1 of 1
APPLICATION NO. : 11/379661
DATED : November 24, 2009
INVENTOR(S) : Ryu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 522 days.

Signed and Sealed this

Fourteenth Day of December, 2010

David J. Kappos
*Director of the United States Patent and Trademark Office*